US012769284B2

(12) United States Patent
Deiss et al.

(10) Patent No.: US 12,769,284 B2
(45) Date of Patent: Oct. 20, 2026

(54) MOBILE COMMUNICATION DEVICE AND MACHINE TOOL MONITORABLE BY WAY OF THE MOBILE COMMUNICATION DEVICE

(71) Applicant: TRUMPF Werkzeugmaschinen SE + Co. KG, Ditzingen (DE)

(72) Inventors: Magnus Deiss, Stuttgart (DE); Manuel Kiefer, Sinsheim (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 488 days.

(21) Appl. No.: 18/307,021

(22) Filed: Apr. 26, 2023

(65) Prior Publication Data

US 2023/0259101 A1 Aug. 17, 2023

Related U.S. Application Data

(63) Continuation of application No. PCT/EP2021/080714, filed on Nov. 5, 2021.

(30) Foreign Application Priority Data

Nov. 6, 2020 (DE) ..................... 10 2020 213 966.0

(51) Int. Cl.
*G05B 19/4155* (2006.01)

(52) U.S. Cl.
CPC .................... *G05B 19/4155* (2013.01); *G05B 2219/35519* (2013.01)

(58) Field of Classification Search
None
See application file for complete search history.

(56) References Cited

U.S. PATENT DOCUMENTS

2010/0023156 A1* 1/2010 Trepina ................ G05B 19/406 700/177
2013/0041938 A1* 2/2013 Lin .................... H04N 21/4782 709/203

(Continued)

FOREIGN PATENT DOCUMENTS

CN 109901538 A 6/2019
DE 102016217443 A1 9/2017

(Continued)

*Primary Examiner* — David Earl Ogg
(74) *Attorney, Agent, or Firm* — LEYDIG, VOIT & MAYER, LTD.

(57) ABSTRACT

A machine tool arrangement includes a machine tool having a sensor device for monitoring at least one part of the machine tool, and a control arrangement for receiving data of the sensor device and controlling at least one part of the machine tool. The machine tool arrangement includes a mobile communication device having an application. The control arrangement is connectable to the mobile communication device, such that the data of the sensor device is representable in the application and at least one part of the machine tool is controllable by way of the application. The machine tool arrangement includes a further mobile communication device having a further application. The control arrangement is connectable to the further mobile communication device, such that the data of the sensor device is representable in the further application and at least one part of the machine tool is controllable by way of the further application.

11 Claims, 4 Drawing Sheets

(56) References Cited

U.S. PATENT DOCUMENTS

| | | | | |
|---|---|---|---|---|
| 2014/0303755 | A1* | 10/2014 | Landgraf | G05B 19/41855 700/83 |
| 2015/0298318 | A1* | 10/2015 | Wang | B25J 9/1689 700/257 |
| 2016/0231724 | A1* | 8/2016 | Bauer | G05B 19/0428 |
| 2017/0308869 | A1* | 10/2017 | Reidinger | G06Q 10/0633 |
| 2018/0129181 | A1* | 5/2018 | Kratzer, III | G06F 40/30 |
| 2018/0159979 | A1 | 6/2018 | Amir et al. | |
| 2018/0188704 | A1 | 7/2018 | Cella et al. | |
| 2019/0243345 | A1* | 8/2019 | Schwarz | G01S 11/08 |
| 2019/0302731 | A1 | 10/2019 | Kettemer et al. | |
| 2020/0026870 | A1 | 1/2020 | Bagley, Jr. et al. | |
| 2020/0026976 | A1 | 1/2020 | Bagley, Jr. | |
| 2020/0057430 | A1* | 2/2020 | Kettemer | G05B 19/4185 |
| 2020/0070295 | A1* | 3/2020 | Uenishi | B23Q 17/12 |
| 2021/0318677 | A1 | 10/2021 | Aiki et al. | |

FOREIGN PATENT DOCUMENTS

| | | | |
|---|---|---|---|
| EP | 3528242 | A1 | 8/2019 |
| KR | 20130028385 | A | 3/2013 |
| KR | 20140065633 | A | 5/2014 |
| RO | 129402 | A0 * | 4/2014 |
| WO | WO 2014088994 | A1 | 6/2014 |
| WO | WO 2019197443 | A1 | 10/2019 |
| WO | WO 2020027095 | A1 | 2/2020 |

* cited by examiner

MOBILE COMMUNICATION DEVICE AND MACHINE TOOL MONITORABLE BY WAY OF THE MOBILE COMMUNICATION DEVICE

CROSS REFERENCE TO RELATED APPLICATIONS

This application is a continuation of International Application No. PCT/EP2021/080714 (WO 2022/096620 A1), filed on Nov. 5, 2021, and claims benefit to German Patent Application No. DE 10 2020 213 966.0, filed on Nov. 6, 2020. The aforementioned applications are hereby incorporated by reference herein.

FIELD

Embodiments of the present invention relate to a machine tool arrangement comprising a machine tool and to a mobile communication device for monitoring the machine tool.

BACKGROUND

It is generally known to equip machine tools with an SMS transmitter in order to transmit fault messages of the machine tool to a mobile communication device of a user of the machine tool. However, fully autonomous operation of the known machine tools is not possible; rather, an assessment of the state of the machine tool and an interaction with the machine tool on site are always necessary. As a result, at present it is possible only with difficulty to attain a high capacity utilization of the machine tool in personless shifts.

US 2018/159979 A1 discloses a remote service system to which a user can have recourse at a production machine. The production machine is monitored on site by the user.

WO 2019/197443 A1 has disclosed providing an intermediate connector which can detect the power consumption of a consumer and communicate it to a user. The consumer is controllable via the intermediate connector.

US 2018/129181 A1 discloses a chatbot for communication with a production machine and for controlling the production machine.

EP 3 528 242 A1 has disclosed methods for human-machine interaction. In particular, EP 3 528 242 A1 discloses a dialogue system between a human and a machine.

SUMMARY

Embodiments of the present invention provide a machine tool arrangement. The machine tool arrangement includes a machine tool having a sensor device for monitoring at least one part of the machine tool, and a control arrangement for controlling the at least one part of the machine tool. The control arrangement is configured for receiving data of the sensor device. The machine tool arrangement further includes a mobile communication device having an application for bidirectional exchange of data with the control arrangement. The control arrangement is communicatively connectable to the mobile communication device via a network link, such that the data of the sensor device is representable in the application and the at least one part of the machine tool is controllable by way of the application. The machine tool arrangement further includes a further mobile communication device having a further application. The application being configured to exchange data, in a form of a chat, with the further application. The control arrangement is communicatively connectable to the further mobile communication device via the network link, such that the data of the sensor device is representable in the further application and the at least one part of the machine tool is controllable by way of the further application.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
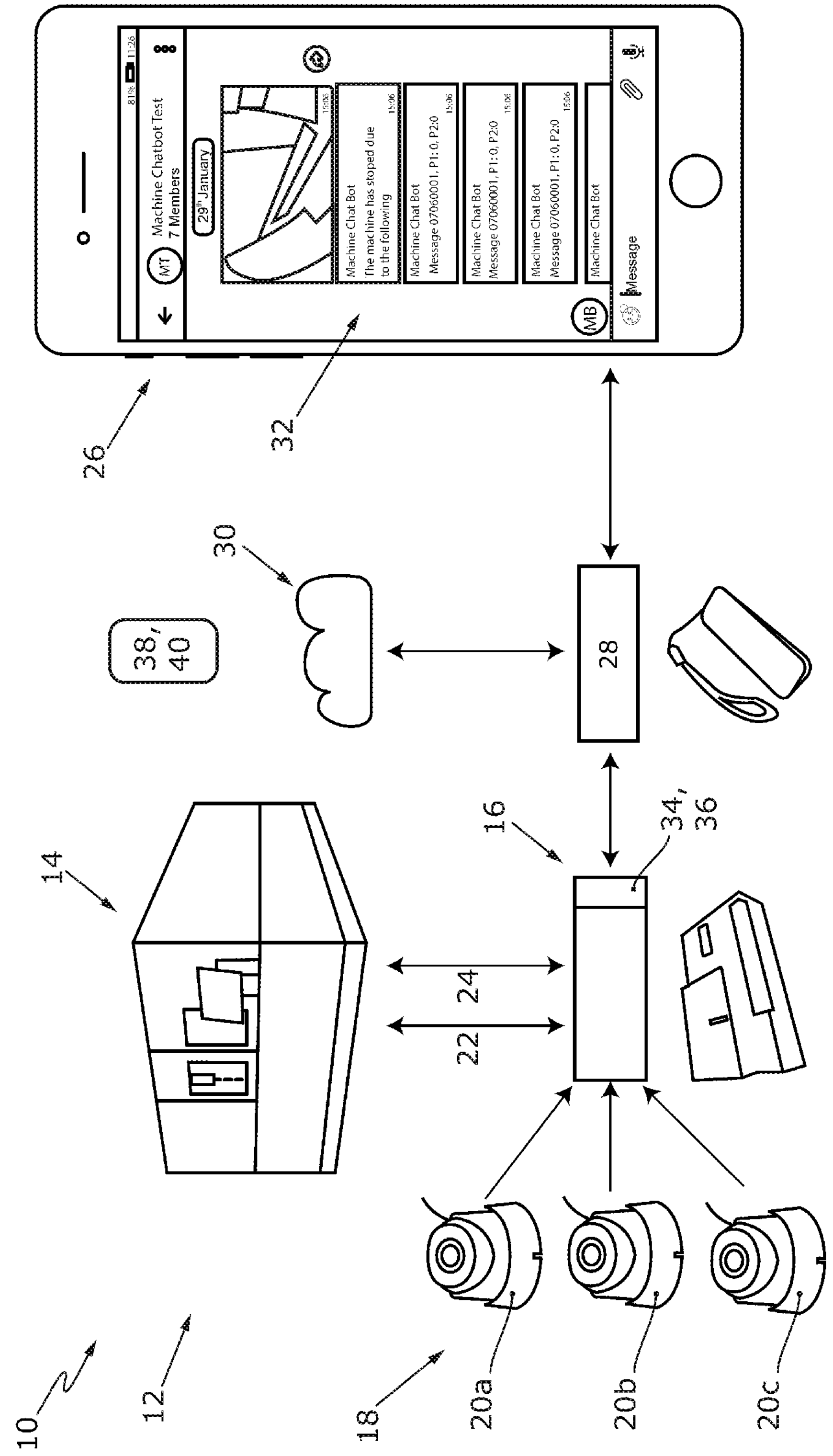
FIG. 1 shows a schematic overview of a machine tool arrangement comprising a control arrangement and a mobile communication device according to some embodiments.

Embodiments of the present invention provide a machine tool arrangement comprising a machine tool, a sensor device for monitoring the machine tool, a control arrangement for controlling the machine tool, and a mobile communication device, the control arrangement being connectable to the mobile communication device via a network link. In this case, the mobile communication device comprises an application ("app") allowing data of the sensor device to be representable on the mobile communication device. Furthermore, the control arrangement is configured to control the machine tool by means of data received from the mobile communication device. The application is designed, by means of the mobile communication device, to exchange data, in particular in the form of a chat, with at least one further application of a further mobile communication device of the machine tool arrangement, the data of the sensor device being representable in the further application, too, via the network link. The control arrangement can be configured to control the machine tool by means of data received from the further mobile communication device. The application and the further application can be configured identically.

Embodiments of the present invention thus provide for a machine tool to be at least partly controllable by way of a mobile communication device and/or a further mobile communication device, in which case the users on their respective mobile communication device can evaluate the state of the machine tool on the basis of the data provided by the sensor device. A plurality of users can coordinate with one another with regard to their procedure. As a result, a high capacity utilization of the machine tool can be achieved even in personless shifts.

Preferably, the machine tool is configured in the form of a machine tool for sheet metal processing, in particular in the form of a laser cutting machine.

In a particularly preferred embodiment of the invention, the sensor device comprises at least one camera, preferably a plurality of cameras. As a result, the users can rapidly establish a meaningful impression of the state of the machine tool.

The control arrangement is configured particularly simply from a design standpoint if it comprises a computer, in particular in the form of an industrial computer, preferably in the form of a single-board computer, in particular in the form of an industrial Raspberry Pi.

The control arrangement can comprise a router, in particular in the form of an LTE router, WLAN and/or a network cable for the network link.

The mobile communication devices can each be configured in the form of a smartphone, laptop, notebook or tablet computer in order to facilitate operability and to increase the availability of the mobile communication devices for the users.

The mobile communication devices can be configured to communicate their location to the control arrangement, for example by means of GPS, mobile radio, WLAN and/or iGPS. The control arrangement can be configured, in a first step, to contact only the mobile communication devices which are in proximity to the machine tool. The control arrangement can furthermore be configured to contact further mobile communication devices only after a predetermined dead time.

The control arrangement can comprise a chatbot, i.e. a text-based dialogue system, in order to facilitate the communication between the users and the control arrangement.

The chatbot can be configured to set up a permanent bidirectional communication exchange. In contrast to email or SMS solutions (“fire and forget”), this enables reception monitoring on both sides (control arrangement and applications). With further preference, the chatbot comprises a watchdog for ensuring machine availability and functionality of the entire communication path from end to end. User commands that get nowhere can be reported back, for example with the message “command could not be carried out”. The watchdog can be configured to deliver ad hoc messages, for example by way of push notification, and to indicate a termination of communication or machine stoppage.

User-friendliness is increased further if the application(s) is/are configured for representing a rating, the rating reflecting the state of the machine tool or a recommendation concerning the further procedure.

The users can get a more precise idea of the state of the machine tool if the control arrangement is configured to communicate data of the machine tool to the application(s) via the network link. Said data of the machine tool can comprise sensor data and/or control data of the machine tool.

Particularly preferably, the control arrangement comprises a filter in order to recognize specific configurations of the sensor device and to communicate them to the application(s) of the communication device. In this case, by means of the filter, in particular in an automated manner, faulty states of the machine tool can be recognized and then the data measured by the sensor device can be communicated to the application(s). As an alternative or in addition thereto, the control arrangement can be configured to communicate the data of the sensor device to the application(s) if the control arrangement recognizes a faulty state of the machine tool, in particular the stoppage of the machine tool, on the basis of other sensor data and/or control data.

The control arrangement can comprise a storage unit for storing the data of the sensor device and/or the data of the machine tool (for example sensor data). The control arrangement can furthermore comprise an evaluation unit for assessing the stored data in order to communicate a recommendation concerning the further procedure on the basis of the assessment to the application(s). In this case, the control arrangement can already make a proposal for the decision by the users. The evaluation unit can comprise an artificial intelligence, in particular in the form of a neural network, in order to establish a precise assessment. The evaluation unit can be configured to continue improving by means of machine learning.

The storage unit and/or the evaluation unit can be configured on a local server or PC and/or in a cloud-based fashion in order to be able to access the experiences of a plurality of users, such that a significantly more precise assessment can be established.

Further advantages of the invention are evident from the description and the drawing. Likewise, according to the invention, the features mentioned above and those that will be explained still further can be used in each case individually by themselves or as a plurality in any desired combinations. The embodiments shown and described should not be understood as an exhaustive enumeration, but rather are of exemplary character for outlining the invention.

FIG. 1 shows a machine tool arrangement 10 comprising a machine tool 12, here in the form of a machine tool for sheet metal processing. The machine tool 12 comprises a, more particularly automated, preferably fully automated, laser cutting tool 14, illustrated symbolically here in the form of a robot. The machine tool arrangement comprises a control arrangement 16 and a sensor device 18.

The sensor device 18 preferably comprises at least one camera 20*a*, 20*b*, 20*c*, in particular a plurality of cameras 20*a-c*. The camera(s) 20*a-c* is/are configured for recording moving images and/or still images. It is thereby possible to capture a machine state. By way of example, the camera(s) can register the fact that a sheet metal part (not shown) has got stuck in the laser cutting tool 14 and is blocking the laser cutting tool 14. The camera(s) 20*a-c* can thus be used to monitor whether the laser cutting tool 14 has a defect.

The data of the sensor device 18 are communicated to the control arrangement 16. The control arrangement 16 can be configured in the form of an industrial Raspberry Pi. The control arrangement 16 is in data exchange 22 with the laser cutting tool 14. The data exchange 22 is preferably effected by way of a platform-independent architecture, in particular by way of Open Platform Communications Unified Architecture (OPC UA). As an alternative or in addition thereto, the control arrangement 16 can obtain its voltage supply 24, in particular 24 V, from the laser cutting tool 14.

The control arrangement 16 is configured for data exchange with a mobile communication device 26, in particular in the form of a smartphone. For this purpose, the control arrangement 16 is connected to a network link 28. In the present case, the network link 28 comprises a router, in particular in the form of an LTE router.

The control arrangement 16 can be connected to a storage and/or evaluation unit 30. The storage and/or evaluation unit 30 is configured in a cloud-based fashion, in particular. The storage and/or evaluation unit 30 preferably makes it possible to accumulate the data of the control arrangement 16 of a plurality of users in order to enable machine learning on the basis of a large amount of data.

The mobile communication unit 26 comprises an application 32, i.e. an app. The application 32 is able to control at least one part of the machine tool 12. Furthermore, the application 32 is able to receive and in particular represent the data of the sensor device 18. In particular, the application 32 is configured to display images of the camera(s) 20*a-c* and to stop the machine tool 12 in an automated manner and/or by way of a user input. As an alternative or in addition thereto, the application 32 is configured to start or to continue the operation of the machine tool 12 in an automated manner and/or by way of a user input.

The control arrangement 16 can comprise a filter 34 in order to identify states of the machine tool 12, in order then to communicate the data of the sensor device 18 to the application 32. By way of example, the filter 34 can be configured to recognize an unexpected state, in particular a defect, of the machine tool 12 and then to communicate the data of the camera(s) 20*a-c* to the application 32.

The control arrangement 16 preferably comprises a chatbot 36. In this case, a chatbot 36 is understood to mean a text-based dialogue system which allows chatting with the mobile communication device 26. In addition thereto, the chatbot 36 can be configured to exchange data with a further mobile communication device 38 or with a further application 40 of the further mobile communication device 38.

The control arrangement 16 is configured for data exchange with the further mobile communication device 38. For this purpose, the control arrangement 16 is connected to the network link 28. As a result, a plurality of users can discuss the state of the machine tool 12 by way of their respective mobile communication device 26, 38. The further communication device 38 is preferably configured in the form of a smartphone.

Figure 2:
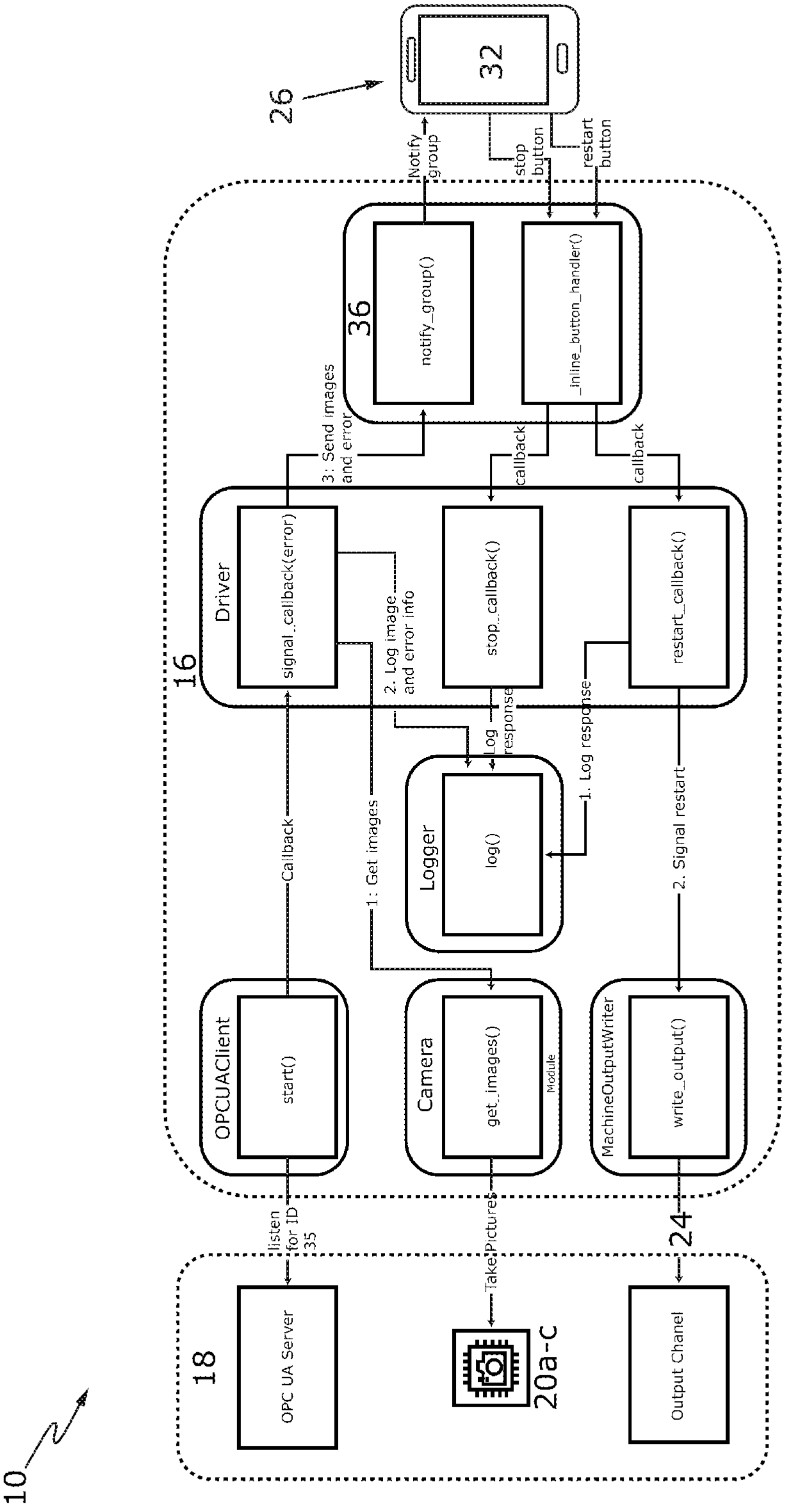
FIG. 2 shows a detailed overview of the data flow of the machine tool arrangement in accordance with FIG. 1 according to some embodiments.

FIG. 2 shows one embodiment of a circuit diagram of the machine tool arrangement 10 described with regard to FIG. 1.

Figure 3B:
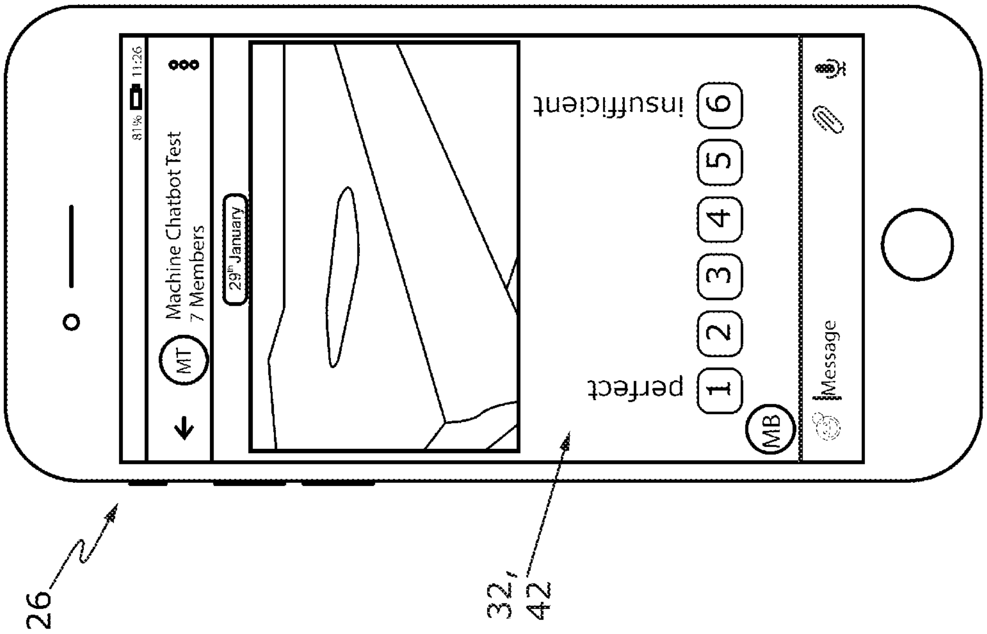
FIG. 3*b* shows a second output of the application of the mobile communication device according to some embodiments.
Figure 3A:
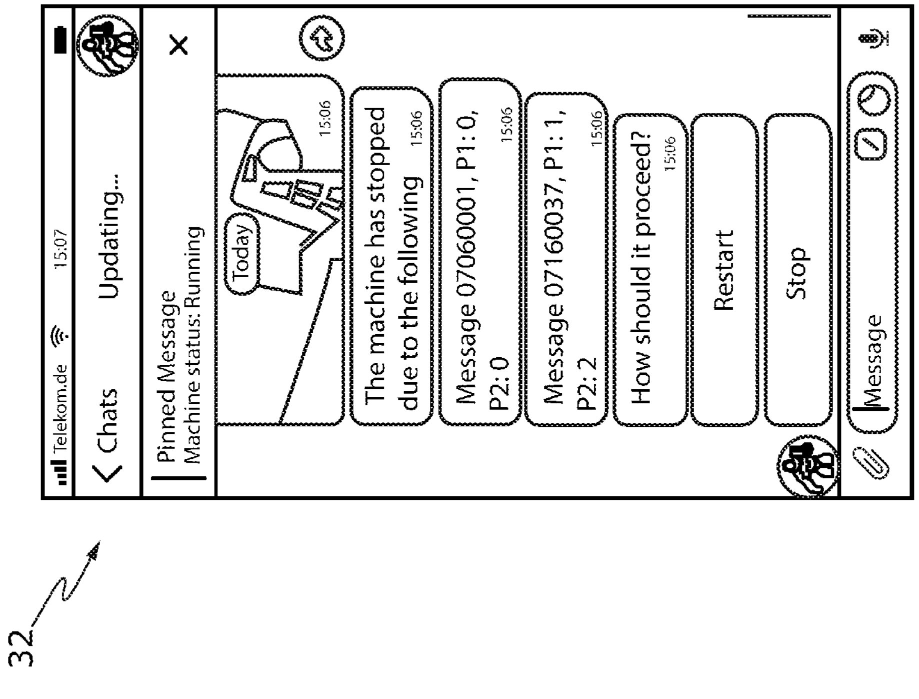
FIG. 3*a* shows a first output of an application of the mobile communication device according to some embodiments.

FIG. 3*a* shows an output of the application 32. It is evident from FIG. 3*a* that the machine tool 12 (see FIG. 1) has stopped operating. An image of the sensor device 18 (see FIG. 1) is communicated to the user of the application 32, with the result that the user himself/herself can establish an impression of the state of the machine tool 12. The user is offered the choice of restarting ("Restart") or completely stopping ("Stop") the machine tool 12.

FIG. 3*b* shows the mobile communication device 26 with a further exemplary output of the application 32. In accordance with FIG. 3*b*, the application 32 outputs a rating 42 regarding the state of the machine tool 12. The rating 42 shows on a scale, here in the form of a grade, whether the machine tool 12 is in a good or bad state.

Figure 3D:
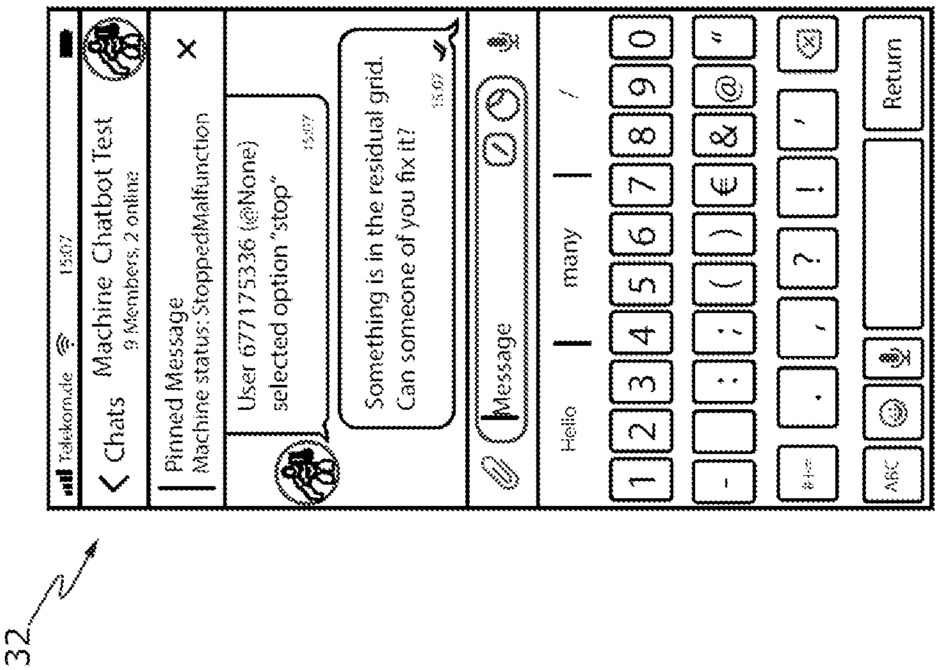
FIG. 3*d* shows a fourth output of the application of the mobile communication device according to some embodiments.
Figure 3C:
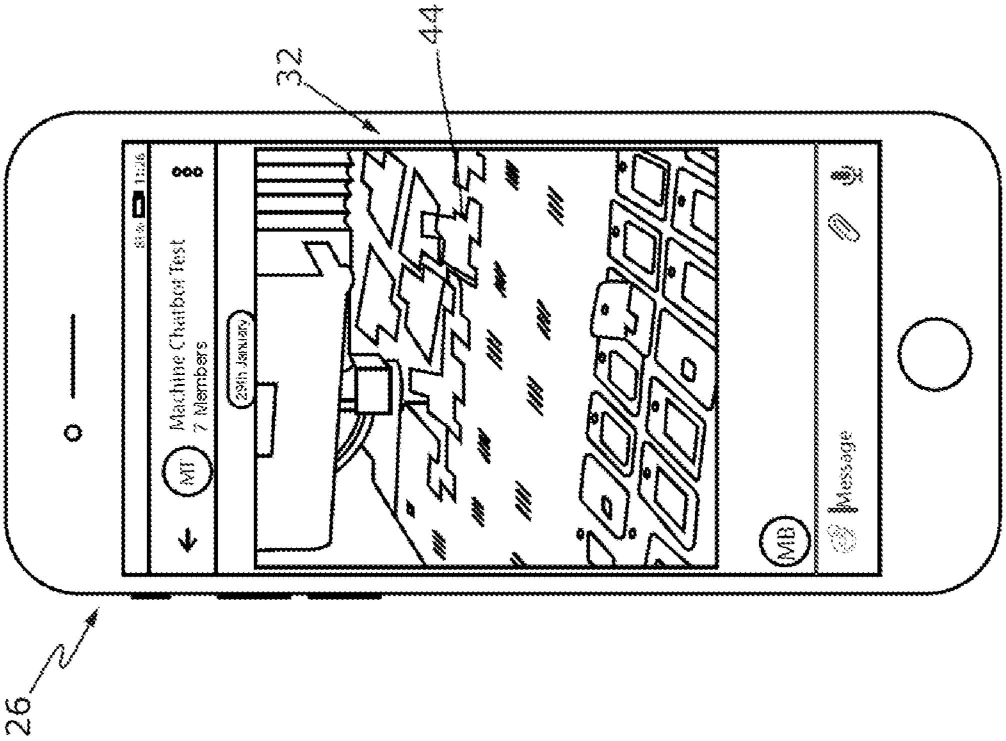
FIG. 3*c* shows a third output of the application of the mobile communication device according to some embodiments.

FIG. 3*c* shows the mobile communication device 26 with a further exemplary output of the application 32. It is evident from FIG. 3*c* that geometric positions 44 can be inserted in the output. The geometric positions 44 can be inserted in the form of arrows, frames and the like.

FIG. 3*d* shows a further output of the application 32 with a chat history. The machine data before an interaction, data of the sensor device 18 (see FIG. 1), in particular in the form of camera images, the information reported back and also the reaction of the machine tool 12 (see FIG. 1) after the interaction are stored and can be used as labels for setting up an automated recognition of the situations. It is thus possible in many cases, on the basis of the machine data and data of the sensor device 18 (see FIG. 1), to send an automated feedback message to the machine tool 12 and to request a manual assessment only in specific situations. In the group of enabled users, before the reaction, a consultation can take place or an operational action on site can be decided.

Taking all the figures of the drawing jointly into consideration, embodiments of the present invention relate to a machine tool arrangement 10 comprising a machine tool 12 and a mobile communication device 26, an application 32 for at least partly controlling the machine tool 12 being installed on the mobile communication device 26. The machine tool arrangement 10 comprises a sensor device 18, the measured data of which are representable in the application 32. The sensor device 18 can be configured in the form of at least one camera 20*a-c*, the images of which are displayable in the application 32. A control arrangement 16 of the machine tool arrangement 10 can comprise a chatbot 36 for communication between the machine tool 12 and a user of the application 32. The application 32 is furthermore configured for communication with a further application 40 on a further mobile communication device 38, in order to enable coordination between the user and a further user. The control arrangement 16 can be configured to inform the user of the application 32 only in an exceptional case. The exceptional case can be ascertained by means of data of the machine tool 12, and/or by means of data of the sensor device 18 that are analysed by a filter 34.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 Machine tool arrangement
12 Machine tool
14 Laser cutting tool
16 Control arrangement
18 Sensor device
20*a-c* Camera
22 Data exchange
24 Voltage supply
26 Mobile communication device

28 Network link
30 Storage and/or evaluation unit
32 Application
34 Filter
36 Chatbot
38 Further mobile communication device
40 Further application
42 Rating
44 Geometric position

The invention claimed is:

1. A machine tool arrangement comprising:

a machine tool having a sensor device for monitoring at least one part of the machine tool;

a control arrangement for controlling the at least one part of the machine tool, the control arrangement being configured for receiving data of the sensor device;

a mobile communication device having an application for bidirectional exchange of data with the control arrangement, the control arrangement being communicatively connectable to the mobile communication device via a network link, such that the data of the sensor device is representable in the application and the at least one part of the machine tool is controllable by way of the application; and a further mobile communication device having a further application, the application being configured to exchange data, in a form of a chat, with the further application, and the control arrangement being communicatively connectable to the further mobile communication device via the network link, such that the data of the sensor device is representable in the further application and the at least one part of the machine tool is controllable by way of the further application, wherein the control arrangement comprises a filter configured to recognize specific configurations of the sensor device and to communicate the specific configurations to the application and/or the further application.

2. The machine tool arrangement according to claim 1, wherein the machine tool is configured for sheet metal processing.

3. The machine tool arrangement according to claim 1, wherein the sensor device comprises at least one camera.

4. The machine tool arrangement according to claim 1, wherein the control arrangement comprises a computer.

5. The machine tool arrangement according to claim 1, wherein the control arrangement comprises a router, a wireless local area network (WLAN) and/or a network cable for producing the network link.

6. The machine tool arrangement according to claim 1, wherein the mobile communication device and/or the further mobile communication device are/is configured in the form of a smartphone, a laptop, a notebook and/or a tablet computer.

7. The machine tool arrangement according to claim 1, wherein the control arrangement comprises a chatbot for communication with the application and/or the further application.

8. The machine tool arrangement according to claim 1, wherein the control arrangement is configured to communicate data of the machine tool to the application and/or the further application via the network link.

9. The machine tool arrangement according to claim 1, wherein the mobile communication device or the further mobile communication device is configured to evaluate a state of the machine tool based on the data provided by the sensor device, and wherein the application or the further application is configured for outputting and displaying a rating for the state of the machine tool as evaluated by the mobile communication device or the further mobile communication device.

10. The machine tool arrangement according to claim 1, wherein the control arrangement comprises a storage unit for storing the data of the sensor device and/or the data of the machine tool, the control arrangement comprising an evaluation unit for assessing the stored data, and the evaluation unit being configured to communicate a recommendation concerning a further procedure on the basis of the assessment to the application and/or the further application.

11. The machine tool arrangement according to claim 10, wherein the storage unit and/or the evaluation unit are/is configured in a cloud-based fashion.

* * * * *